United States Patent [19]

Feigin

[11] 4,074,970
[45] Feb. 21, 1978

[54] DYEING OF SYNTHETIC FIBERS WITH CATIONIC DYES IN THE PRESENCE OF CATIONIC ASSISTANTS CONTAINING HYDROXYL AND CYCLIC MOIETIES

[75] Inventor: Robert Feigin, West Orange, N.J.

[73] Assignee: Sybron Corporation, Rochester, N.Y.

[21] Appl. No.: 741,703

[22] Filed: Nov. 15, 1976

[51] Int. Cl.² .................. C09B 67/00; D06P 1/41; D06P 1/642
[52] U.S. Cl. ........................ 8/169; 8/172 R; 8/177 AB; 8/84; 260/567.6 M
[58] Field of Search ............... 8/169, 177 AB, 85 R, 8/84, 1 S, 172 R

[56] References Cited

U.S. PATENT DOCUMENTS

| | | | |
|---|---|---|---|
| 2,775,604 | 12/1956 | Zech | 260/567.6 M |
| 3,033,640 | 5/1962 | Hofer et al. | 8/172 R |
| 3,643,270 | 2/1972 | Kirschnek et al. | 8/177 AB |
| 3,716,329 | 2/1973 | Komminos et al. | 8/169 |
| 3,919,319 | 11/1975 | Hintermeier et al. | 8/84 |
| 3,995,997 | 12/1976 | Boehmke et al. | 8/172 R |

FOREIGN PATENT DOCUMENTS

| | | | |
|---|---|---|---|
| 717,425 | 9/1965 | Canada | 8/84 |
| 1,123,286 | 2/1962 | Germany | 8/177 AB |

Primary Examiner—Joseph L. Schofer
Assistant Examiner—Maria S. Tungol
Attorney, Agent, or Firm—Theodore B. Roessel; Papan Devnani

[57] ABSTRACT

Level dyeings of synthetic fibers with cationic dyestuffs is achieved with the use of surface active agents having the general formula:

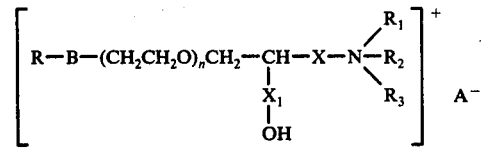

where R is selected from the group of aliphatic hydrocarbons containing about 8 to 22 carbons atoms, mono- and di-alkylbenzenes where the alkyl chains contain about 8 to 12 carbon atoms each, B is selected from the group of $-CH_2-$, Oxygen atom and Sulfur atom n is a number ranging from zero to about 4 $R_1$, $R_2$ $R_3$ contain at least one cyclic or heterocyclic structure and together contain no more than one hydroxyl group A is a water-solubilizing anion
$X = (CH_2)_a$ $X_1 = (CH_2)$ b
a = 0 or 1 and b = 0 or 1 and a + b = 1

9 Claims, No Drawings

DYEING OF SYNTHETIC FIBERS WITH CATIONIC DYES IN THE PRESENCE OF CATIONIC ASSISTANTS CONTAINING HYDROXYL AND CYCLIC MOIETIES

BACKGROUND OF THE INVENTION

This invention relates to the dyeing of synthetic fibers which have been modified chemically to make them receptive to basic cationic dyestuffs, especially fibres of polyacrylonitrile containing 85% or less acrylonitrile units, polyesters and polyamides.

Synthetic fibers have such a strong affinity for basic dyestuffs that the dyes, which become absorbed on the dye sites, do not distribute themselves uniformly under atmospheric dyeing conditions at the boil. This results in uneven or unlevel dyeing. In the dyeing of acrylics, the affinity of each dye and the rate of exhaustion of dyestuffs from the dyebath vary with the dye being used often making the levelness of dyeing unpredictable. Temperature differences from one part of the dyeing equipment to the other aggravate this difficulty. Certain chemical additives and methods have been used to overcome these difficulties to a certain extent, but there are still deficiencies in performance, handling and cost which make them unacceptable for routine dyeing.

In an attempt to increase the absorption and improve the evenness of the dyeings, certain substances generally referred to as dyeing assistants are added to the dye bath to promote or to control dyeing. Such substances aid in the achievement of uniform absorption of the dye by the fiber. The manner in which the level-dyeing is accomplished depends generally upon the particular dyestuff in use and also upon the substance which is employed as a dyeing assistant. Usually, a dyeing assistant will aid in promoting level deposition of the dye on the fiber or fabric in several ways. Some dyeing assistants will accomplish the desired result by delaying the absorption of the dye by the fiber. Anionic dyeing assistants will function as such by accelerating the dye absorption on the material to be colored. However, in many cases, it has been found that the addition compounds formed between the dyestuff and the aforesaid dyeing assistants are very stable and in the course of the dyeing process, the dyestuff is only partially liberated even if the temperature is increased. As a result, considerable amounts of dyestuffs are lost during the dyeing process.

In an attempt to avoid the aforesaid difficulties with respect to dyeing, retarders have been employed to cause the rate of strike to become slower at the critical temperature that is, at the temperature between 180° and 200° F. Two types of retarders have been generally used; the first type is the cationic retarder and a substance of this type functions by competing with the dye for the available dye sites. A cationic retarder has more affinity for the dye site and, due to its smaller molecular size, is able to precede the dye at slightly lower temperatures. As a result, less dye sites are available at temperatures between about 180° and 200° F. and the shortage of sites causes the dye to seek out vacant sites and draw out of the bath evenly. It has been shown that with this retarder system, the dye strike from the 200°-206° F. is extremely rapid and this further narrows an already dangerously narrow temperature range.

In order to dye synthetic fibers by the exhaustion method with basic dyestuffs and in level shades, a dye liquor has been used which in addition to basic dyestuffs, contained as dye assistants tertiary, mono- or bis-quaternary organic nitrogen compounds having at least one higher alkyl radical per molecule. As a rule, these assistants detrimentally affect the fastness to light of the dyeings obtained and block the fibers i.e., as soon as a portion thereof has been drawn onto the fiber, they reduce the absorption power of the fiber both for further basic dyestuff and for further dye assistant. This blocking effect on the fiber makes the redyeing and in particular cross dyeing of a shade already attained very much more difficult. Since the blocking effect caused by the known dye assistants on the polyacrylonitrile fiber affects the individual basic dyestuff present in a mixture of dyes in different degrees, it is also often impossible to attain or reproduce a desired shade with mixtures of basic dyestuffs. Finally, the blocking effect has a varying influence on the rate at which the basic dyestuffs draw onto the aforesaid type of fibers which, in practice, leads to uneven distributions of the dyestuffs. Moreover, since the hitherto used dye assistants which have drawn onto the fiber are very difficult to remove, this blocking effect is often irreversible.

In the prior art many methods for obtaining level cationic dyeings are described in the literature for instance in the U.S. Pat. Nos. 3,667,899 3,632,300 and 3,355,243. The object of this invention is to obtain well-penetrated level dyeings and maximum color yield with cationic dyestuffs. This objective is achieved by using cationic surface active agents having the following general structure:

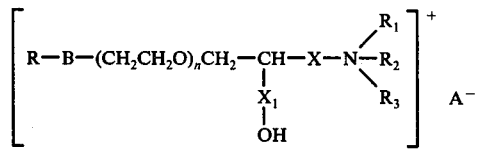

DETAILED DESCRIPTION OF THE INVENTION

There are many suggested systems and methods for obtaining level cationic dyeings, described in the literature. Most of these examples are done in the laboratory using exhaustion rates or dye transfer studies. However, when these operations are scaled up to the actual plant size, requiring large masses of fiber, liquids, and conveying distances, these systems do not work. In using the dyeing assistants of the present invention as will be demonstrated the dyestuffs go on to the fibers uniformly throughout the dyeing procedure. These surfactants are generally weaker as retarders than the well-known alkyl dimethyl benzyl ammonium chloride type which hold back too much dyestuff. They may be weaker or equal to the alkyl trimethyl or triethyl ammonium type. It is not an object of this invention to make a powerful retarder. By balancing the chemical structure of the molecule, I have been able to obtain the desired combination of retardation and dye migration. Tests on a large scale with various dyestuffs have confirmed laboratory results.

I am not sure about the theory involved but experiments with different molecules and molecular configurations have indicated that the presence of the hydroxyl group makes for a weak retarder while the cyclic moiety produces a strong one. Hence, the molecule can be balanced. One additional hydroxyl group can be tolerated. Similarly, up to about 4 ethylene oxide groups may also be tolerated.

The cyclic groups may be either attached to or include the nitrogen atom; for example, benzyl, phenylethyl, morpholine, cyclohexyl, pyridine, quinoline, isoquinoline, piperidine, aniline and alkylated derivatives of these such as 2-methyl-5-ethyl pyridine and the like. The non-cyclic $R_1$ or $R_2$ or $R_3$ are preferably lower alkyl groups containing up to about 4 carbon atoms each.

The R-group provides the surface activity of the molecule. It may be either linear or non-linear or alkyl aryl. Suitable starting materials include straight or branched chain alcohols, mercaptans, alkylphenols and olefins. The anion A used or formed in the synthesis is of no consequence for the application of the surfactant so long as it makes it soluble or dispersible in water. It may be a halogen, sulfate, metho- or etho-sulfate, tartrate, lactate, citrate, nitrate, etc. The surfactants can be synthesized in various ways depending upon the choice of reactants. One may start with an olefin-derived epoxide and react it with a secondary amine to form a hydroxyalkyl tertiary amine, next quaternizing with a suitable reactant.

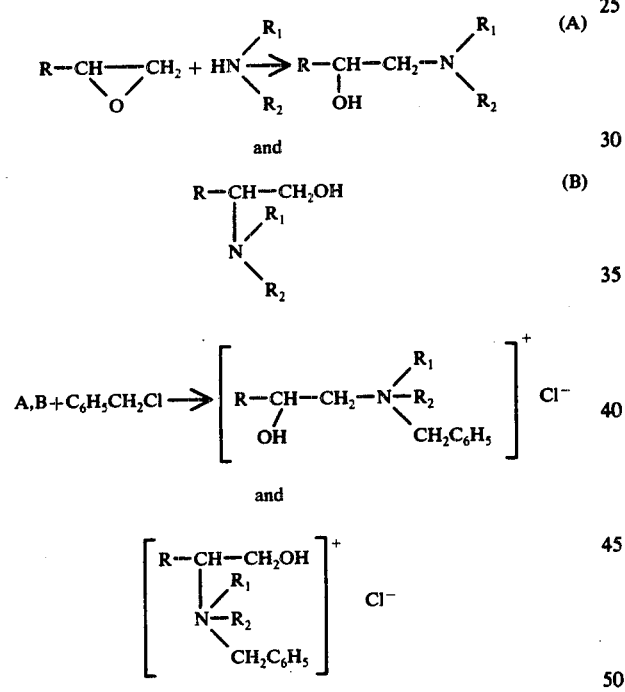

Since the epoxide ring tends to open in both possible ways giving a general ratio of 3-4:1 of A to B types, there generally will be found both isomeric derivatives. In this example the aromatic moiety is introduced with the use of benzyl chloride.

Another type of product may be obtained using commercially available glycidyl ethers. For example:

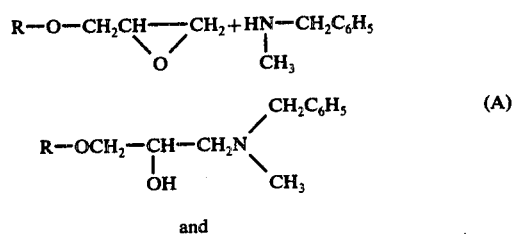

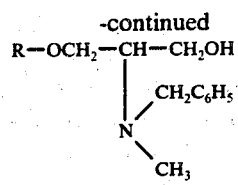

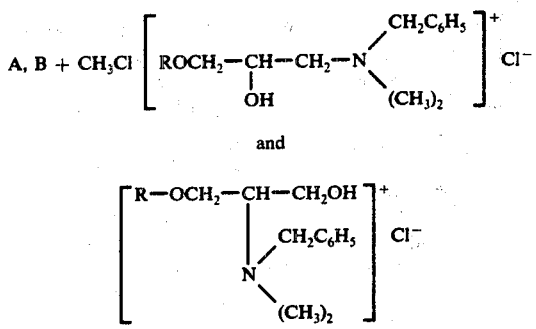

Another preparative method is as follows:

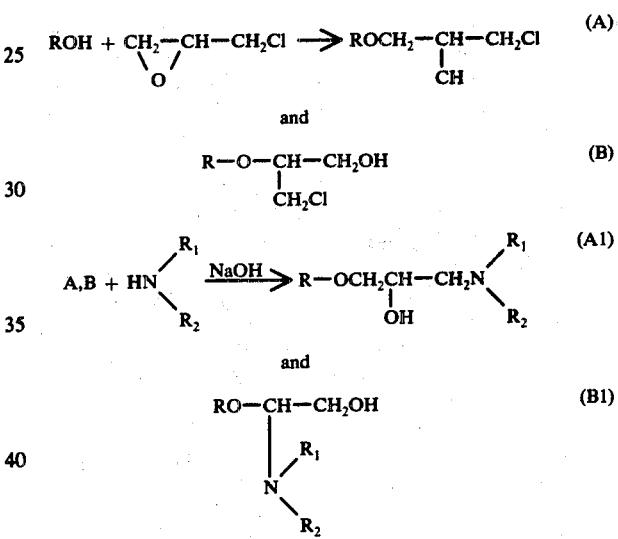

A1 and B1 are then quaternized with a suitable alkylating agent as in preceding examples.

Many variations are possible, including mixtures. It is also useful to incorporate small amounts of nonionic surfactants. These provide wetting and dispersing properties but are not needed for the invention.

Following are typical preparations of suitable products in accordance with this invention. For the sake of brevity only the A-type isomer will be indicated. It should be understood that in all cases lesser amounts of the B-type are formed.

Preparation 1.

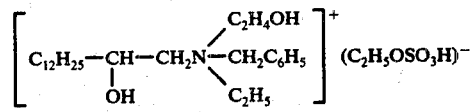

A mixture of 45.4 parts 1, 2-epoxytetradecane containing 7.05% oxirane oxygen, 26.6 parts N-benzyl-N-ethanolamine, 35 parts isopropanol, 4 parts sodium hydroxide and 20 parts water was heated at 85° C for 1 hour thereby forming the tertiary amine. To this mixture 30.8 parts diethyl sulfate, and 160 parts water were added and then refluxed for an hour to form the quaternary product. Ten parts of a nonionic surface active agent, Igepal CO-850 (Regd. TM of GAF Inc.) an ethoxylated (20 ethylene oxide units) nonylphenol, was incorporated to form a homogenous composition containing 30% active quaternary ammonium compound.

Preparation 2.

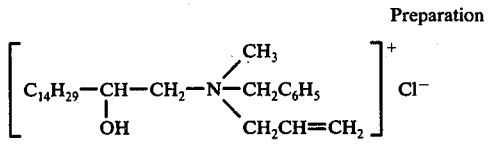

A mixture of 52.4 parts 1, 2-epoxyhexadecane containing 6.12% oxirane oxygen, 24.2 parts N-benzyl N-methylamine, 30 parts isopropanol, 3 parts sodium hydroxide and 10 parts water was heated at 85° C for 1 hour to prepare the intermediate tertiary amine. To this mixture 14.3 parts allyl chloride and 200 parts water were added and the mixture refluxed for 2 hours to form the quaternary product. Non-ionic surfactant, 15 parts Igepal CO-850 (Regd. TM of GAF, Inc.) was then added to make a composition containing 22% active quaternary ammonium compound.

Preparation 3.

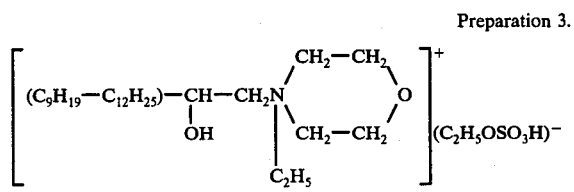

A mixture of 104 parts containing 1, 2-epoxy alkanes with a combining weight of 208 (Nedox 114, Reg. TM of Ashland Chemical Corp); 43.5 parts morpholine, 67.5 parts isopropanol, 1.5 parts sodium hydroxide and 13 parts water was refluxed for an hour to form the tertiary amine. Half of the mixture was saved for preparation 4.

To 114 parts of the above, 38 parts diethylsulfate and 38 parts water were added. Upon heating for about ½ hour at 85° C. the quaternary was formed. The product was then further diluted with water and 2.5 parts of Igepal CO-850 nonionic surfactant to 30% active quaternary ammonium composition.

Preparation 4.

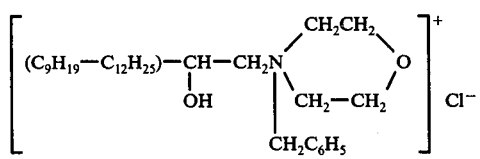

To 114 parts of tertiary amine product of the preceding preparation, 32 parts benzyl chloride was added and the mixture refluxed for 1½ hours to form the quaternary. The product was further diluted with 2.5 parts Igepal CO-850 and water to 30% active quaternary ammonium composition.

Preparation 5.

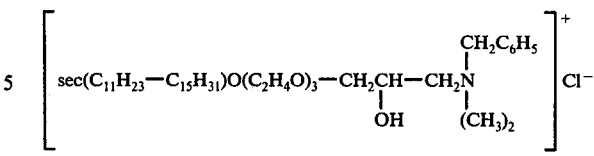

Ethoxylated (3 ethylene oxide units) $C_{11}$-$C_{15}$ secondary alcohols, mixed isomers (Tergitol, Reg. TM of Union Carbide) - 664 parts, and 4 parts boron fluoride etherate were mixed and heated to 75° C. Over a period of 2 hours, 185 parts epichlorhydrin was added and then heated to 110° C over a period of ½ hour to form the chlorhydrin product (and its isomer):

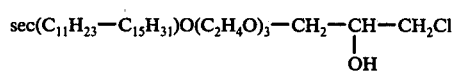

A mixture containing 85 parts of this together with 27 parts benzyldimethylamine, 38 parts isopropanol, 4 parts sodium hydroxide, 212 parts water and 9 parts Igepal CO-850 was heated at 85° C to form a clear composition containing 30% of the quaternary ammonium compound.

Preparation 6.

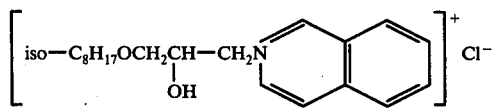

Oxo process octyl alcohol containing various branched primary alcohols, 1058 parts, and boron fluoride etherate, 2 parts were mixed and heated to 65° C. Epichlorhydrin, 753 parts, was added to the mixture over a period of 3 hours while maintaining the temperature. It was then heated briefly to 120° C to consume all of the epichlorohydrin to obtain the chlorhydrin:

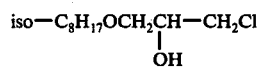

To form the quaternary as a 30% solution, a mixture containing 66.6 parts of the chlorhydrin, 38.7 parts quinoline, 4.0 parts sodium hydroxide, 35 parts ethylene glycol monobutyl ether, 196 parts water and 10 parts Igepal CO-850 was heated at 85° C for 1 hour.

Preparation 7.

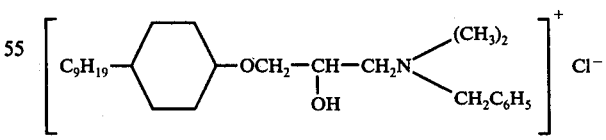

Nonylphenol, 440 parts and boron fluoride etherate, 2.2 parts were mixed and heated to 75° C. While maintaining the temperature, 195 parts of epichlorhydrin was added over a period of 2 hours. The temperature was then raised to 105° C over a period of a half hour to react the last traces of epichlorhydrin. After cooling the chlorhydrin, 62.5 parts of it together with 27.0 parts benzyldlmethylamine, 30 parts isopropanol, 3.0 parts sodium hydroxide 167 parts water and 10 parts Igepal CO-850 were mixed and heated for 1 hour at 85° C to obtain a composition containing 30% of the quaternary ammonium compound.

Preparation 8.

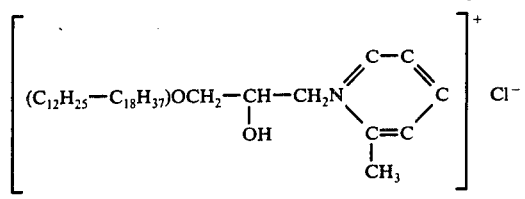

Mixed linear $C_{12}$-$C_{18}$ alcohols (Alfol 1218 Reg. TM of Continental Oil Co.), 324 parts and boron fluoride etherate, 2.1 parts, were mixed and 138.8 parts epichlorhydrin added as in the preceding example to form the analogous chlorhydrin derivative. A mixture containing 61.8 parts of the chlorhydrin, 18.6 parts alpha picoline, 27.0 parts isopropanol, 3.0 parts sodium hydroxide, 146 parts water and 9 parts Igepal CO-850 was heated at 85° C for 1½ hours to obtain a composition containing 30% of the indicated quaternary ammonium compound.

Preparation 9.

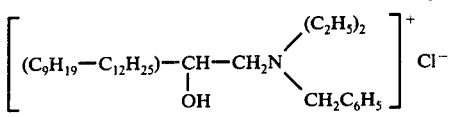

A mixture of 1,2- epoxy alkanes with a combining weight of 208 (Nedox 1114) 62.4 parts, diethylamine 21.9 parts, isopropanol 45 parts, water 130 parts and 3 parts sodium hydroxide was heated at 85° C for 1¼ hours to form the intermediate tertiary amine as in preceding examples. The mixture was then cooled and 37.8 parts benzyl chloride added together with additional water and Igepal CO-850 which was then heated under reflux for 1½ hours to obtain a composition containing 30% quaternary and 2.5% nonionic surfactant.

Preparation 10.

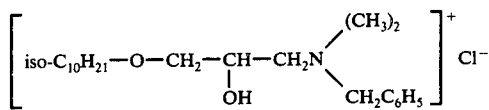

Oxo process iso-decyl alcohol containing mixed isomers, 663 parts and 3.6 parts boron fluoride-phosphoric acid were heated to 45° C. and the temperature maintained for 3 hours while 277.5 parts epichlorhydrin was added. After an additional hour, cooling was removed and the batch heated to 85° C to complete the reaction. The catalyst was neutralized with 1.8 parts lime. Heat and vacuum to 40 mm. atmospheric were then applied to remove 214 parts of excess unreacted iso-decyl alcohol, giving a yield of 730 parts chlorhydrin adduct.

To a mixture of 63 parts sodium hydroxide, 315 parts water, 183 parts 38.5% dimethylamine solution, 363 parts of the chlorhydrin was added over a period of 45 minutes while allowing the temperature to rise to 55° C. It was then heated to 80° C and maintained an additional 2 hours. After cooling to 40° C, 189 parts benzyl chloride was added over a period of 20 minutes while the temperature rose to 65° C. After heating to 80° C and maintaining the temperature for an additional hour, the mixture was allowed to stand for a half hour. The upper layer of 748 parts was separated and it contained 75.5% by weight of the desired quaternary. The solution was then diluted with water, 10% isopropanol and 2.5% Igepal CO-850 to make a thin composition containing 30% quaternary ammonium compound.

The following examples illustrate the performance of the dyeing assistants prepared according to this invention:

EXAMPLE 1

To illustrate the dye leveling properties, swatches of Orlon 75 (Reg. TM of duPont) acrylic fabric previously dyed with a combination of 1% each Basic Blue 3 and Basic Yellow 11 to a green shade without any dyeing assistant, were employed. Tests were made using an Ahiba Vistamatic automatic dyeing machine. Equal weights of dyed and undyed fabric were inserted into each dyeing tube. The liquor to fabric ratio was adjusted to 20:1. To each were added 5% sodium sulfate on total fiber weight and 2.5% on total fiber weight of the preceding preparations in separate dyeing tubes, except for a control, and the pH adjusted to 4.5 with acetic acid. The tubes were all heated simultaneously to the boil and maintained with agitation for 1 hour at the boil. After cooling, rinsing and drying the fabrics were examined. In all cases, with the dyeing assistants, the dye transfer onto the undyed fabric was even and on tone. The control dyeing made without additive was uneven and blotchy, failing to migrate the yellow dyestuff properly.

EXAMPLE 2

Comparative dye retardation and exhaustion studies were made using 0.4% Basic Blue 78, a fast exhausting dyestuff and 0.5% Basic Yellow 15, a slow exhausting one. Using a liquor ratio of 20:1 in the Ahiba Vistamatic dyeing tubes, each bath contained 5% sodium sulfate, 2.5% of the same additives as in Example 1, one contained a like amount of 30% active alkylbenzyldimethyl ammonium chloride and a control with no additive, all adjusted to pH 4.5 with acetic acid. The temperature was then raised 0.5° C per minute and then maintained at the boil for 1 hour. During the heating period small swatches were cut off to observe dye retardation and exhaustion. On reaching the boil the alkylbenzyldimethyl ammonium chloride dyeing was a light blue, after an additional 15 minutes it was a darker blue with no exhaustion of the yellow dye. After a total of 1 hour at the boil there was still considerably more dyestuff remaining in the bath. During the same period all of the dyeings with the other additives while showing significant retardation as compared to the control, gradually became the same green shade also, with insignificant differences of residual dyestuffs in the baths.

EXAMPLE 3

Retardation studies were made using the following dyestuff combinations as in the preceding Examples.
  A. 0.4% each Basic Blue 54 and Basic Yellow 25
  B. 0.3% each Basic Blue 3, Basic Red 14 and Basic Yellow 13
  C. 0.3% each Basic Blue 69, Red 29 and Yellow 25
The results were similar to the previous dyeings.

EXAMPLE 4

Large scale comparative mill dyeings were made on acrylic stock fibers of Orlon 32 and 321 (Reg. TM of duPont) Acrilan (Reg. TM of Monsanto) in 22 Morton Co. raw stock dyeing machines. Combinations of the following dyestuffs were evaluated.

Basic Yellow 19, 21, 25, 41
Basic Orange 21, 22
Basic Red 29
Basic Blue 54

Dye baths were prepared containing up to 1,000 pounds of the raw stock using a liquor ratio of 8:1 with sodium sulfate, 5% on weight of fiber, pH adjusted to approximately 4.5 and for light shades, 3% leveling agent, and for medium shades 1.5%. Preparation 10 was compared with an equal quantity of alkyltrimethyl ammonium chloride product. On reaching 75° C, the rate of heating was adjusted to 1° C per minute up to 93° C. The temperature was held for 20 minutes then raised at the rate of about 1.5° C every 5 minutes up to the boil and then maintained at the boil for 1 hour. After dyeing and rinsing, the stock was checked for uniformity. In each case the lots dyed with Preparation 10 were perfectly uniform while the control dyeings with alkyltrimethyl ammonium chloride were not.

Example 4 proves more than any laboratory tests, the effectiveness of products described in this invention. Many more preparation and examples could be described, all within the claims. The amount of dyeing assistants to be employed will vary more or less inversely with the quantity of dyestuffs to be applied. For light shades a typical average amount will be 1.5%–2.5% active quaternary but for difficult shades or repairing of unsatisfactory dye lots might be doubled. For medium shades about on half of these quantities, while for heavy shades 0.05% on the total fiber weight will suffice. Normally Glauber's salt or anhydrous sodium sulfate will be employed to provide a common ion effect. In the case of cationic dyeable polyesters, sodium sulfate is required to protect the fiber itself. Thus, it should be appreciated that the present invention accomplishes its intended objects in providing a unique surface active agent for level dyeings of synthetic fibres with cationic dyestuffs. Though the present examples use polyacrylonitrile fibres, the invention may be practised with polyesters and polyamides fibres, and such can be demonstrated by replacing the polyacrylonitrile fibres with these fibers in the above examples. Although specific components proportion and procedures have been stated in the above description of the preferred embodiments of the novel surface active agent other suitable materials and procedures such as those described above may be employed to synergize, enhance or otherwise modify the novel method. Other modifications and ramifications of the present invention would appear to those skilled in the art upon a reading of the disclosure. These are intended to be included within the scope of the invention.

I claim:

1. A process for coloring cationic-dyeable fibers in the presence of compounds having the structure:

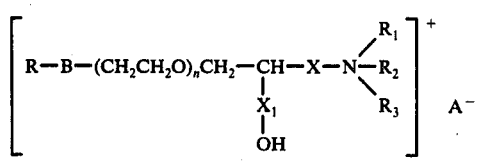

where R is selected from the group of aliphatic hydrocarbons containing about 8 to 22 carbon atoms, mono- and di-alkylbenzenes where the alkyl chains contain about 8 to 12 carbon atoms each, B is selected from the group of —$CH_2$—, Oxygen atom and Sulfur atom n is a number ranging from zero to about 4

$R_1$, $R_2$, $R_3$ contain at least cyclic or heterocyclic structure and together contain no more than one hydroxyl group A is a water-solubilizing anion $x = (CH_2)_a$ and $X_1 = (CH_2)_b$ $a = 0$ or 1 and $b = 0$ or 1 and $a + b = 1$.

2. The process according to claim 1, wherein n is zero.

3. The process according to claim 1 wherein $R_1$ is $C_6H_5CH_2$—.

4. The process according to claim 1 where

is a cyclic structure selected from the group of morpholines, pyridines, piperidines, quinolines, and isoquinolines.

5. A coloring bath containing a cationic dyestuff and a compound having the structures of claim 1.

6. The process according to claim 1 wherein the compound has the structure:

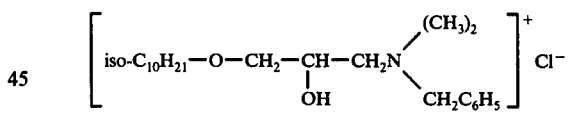

7. The process according to claim 1 wherein the fibers are selected from a group consisting of polyacrylonitriles, polyesters and polyamides.

8. The process according to claim 2 wherein $R_1$ is $C_6H_5CH_2$—.

9. The process according to claim 2 wherein

is a cyclic structure selected from a group of morpholines, pyridines, piperidines, quinolines and isoquinolines.

* * * * *